US009862155B2

United States Patent
Li et al.

(10) Patent No.: US 9,862,155 B2
(45) Date of Patent: Jan. 9, 2018

(54) METHOD FOR MAKING ELECTROTHERMAL ACTUATORS

(71) Applicants: Tsinghua University, Beijing (CN); HON HAI PRECISION INDUSTRY CO., LTD., New Taipei (TW)

(72) Inventors: Qing-Wei Li, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 267 days.

(21) Appl. No.: 14/754,733

(22) Filed: Jun. 30, 2015

(65) Prior Publication Data

US 2016/0023411 A1   Jan. 28, 2016

(30) Foreign Application Priority Data

Jul. 23, 2014 (CN) .......................... 2014 1 0351924

(51) Int. Cl.
*H05K 3/02* (2006.01)
*H05K 3/10* (2006.01)
(Continued)

(52) U.S. Cl.
CPC .............. *B29C 70/882* (2013.01); *B32B 5/02* (2013.01); *B32B 5/16* (2013.01); *B32B 7/02* (2013.01); *B32B 25/047* (2013.01); *B32B 25/10* (2013.01); *B32B 25/20* (2013.01); *B32B 27/12* (2013.01); *B32B 27/14* (2013.01); *B32B 27/28* (2013.01); *B32B 27/302* (2013.01); *B32B 27/308* (2013.01); *B32B 27/32* (2013.01); *B32B 27/38* (2013.01); *B29C 70/682* (2013.01);
(Continued)

(58) Field of Classification Search
CPC ..... B29C 70/682; B29C 70/78; B29C 70/882; B32B 5/02; B32B 5/16; B32B 7/02; B32B 25/047; B32B 25/10; B32B 25/20; B32B 27/12; B32B 27/14; B32B 27/28; B32B 27/302; B32B 27/308; B32B 27/32; B32B 27/38
See application file for complete search history.

(56) References Cited

U.S. PATENT DOCUMENTS 7,197,804 B2 *  4/2007  Muller ................ H01L 21/4878
                                              257/E23.109
8,421,315 B2 *  4/2013  Chen ........................ F03G 7/005
                                              310/363
(Continued)

FOREIGN PATENT DOCUMENTS

CN         102201532         9/2011
CN         103172044         6/2013
(Continued)

*Primary Examiner* — Paul D Kim
(74) *Attorney, Agent, or Firm* — ScienBiziP, P.C.

(57) ABSTRACT

A method for making an electrothermal actuator requires a carbon nanotube paper being provided. The carbon nanotube paper is cut along a cutting-line to form a patterned carbon nanotube paper. At least two electrodes are formed on the patterned carbon nanotube paper. Finally, the electrothermal actuator is obtained by forming a flexible polymer layer on the patterned carbon nanotube paper.

12 Claims, 11 Drawing Sheets

(51) Int. Cl.

| | | |
|---|---|---|
| *B29C 70/88* | (2006.01) | |
| *B32B 5/02* | (2006.01) | |
| *B32B 5/16* | (2006.01) | |
| *B32B 7/02* | (2006.01) | |
| *B32B 25/04* | (2006.01) | |
| *B32B 25/10* | (2006.01) | |
| *B32B 25/20* | (2006.01) | |
| *B32B 27/12* | (2006.01) | |
| *B32B 27/14* | (2006.01) | |
| *B32B 27/28* | (2006.01) | |
| *B32B 27/30* | (2006.01) | |
| *B32B 27/32* | (2006.01) | |
| *B32B 27/38* | (2006.01) | |
| *B29C 70/78* | (2006.01) | |
| *B29C 70/68* | (2006.01) | |
| *B29K 101/12* | (2006.01) | |
| *B29L 31/34* | (2006.01) | |
| *B29K 507/04* | (2006.01) | |

(52) U.S. Cl.
CPC .......... *B29C 70/78* (2013.01); *B29K 2101/12* (2013.01); *B29K 2507/04* (2013.01); *B29L 2031/34* (2013.01); *B32B 2255/02* (2013.01); *B32B 2255/04* (2013.01); *B32B 2260/021* (2013.01); *B32B 2260/025* (2013.01); *B32B 2260/046* (2013.01); *B32B 2262/106* (2013.01); *B32B 2264/108* (2013.01); *B32B 2270/00* (2013.01); *B32B 2307/202* (2013.01); *B32B 2307/30* (2013.01); *B32B 2307/308* (2013.01); *B32B 2307/546* (2013.01); *B32B 2307/72* (2013.01); *B32B 2457/00* (2013.01)

(56) References Cited

U.S. PATENT DOCUMENTS

| | | | | |
|---|---|---|---|---|
| 8,593,034 | B2* | 11/2013 | Liu | ................ F03G 7/005 |
| | | | | 310/328 |
| 2007/0170437 | A1* | 7/2007 | Parsons | ................ G11C 13/02 |
| | | | | 257/77 |
| 2010/0267883 | A1* | 10/2010 | Bhatt | ................ B82Y 30/00 |
| | | | | 524/495 |
| 2011/0234053 | A1 | 9/2011 | Chen et al. | |
| 2011/0292479 | A1 | 12/2011 | Hiraoka et al. | |
| 2013/0160933 | A1 | 6/2013 | Lhang et al. | |

FOREIGN PATENT DOCUMENTS

| | | |
|---|---|---|
| CN | 103367629 | 10/2013 |
| EP | 2352050 | 8/2011 |
| JP | 2011-211888 | 10/2011 |
| TW | 201135997 | 10/2011 |
| TW | 201326031 | 7/2013 |

* cited by examiner

METHOD FOR MAKING ELECTROTHERMAL ACTUATORS

CROSS-REFERENCE TO RELATED APPLICATIONS

This application claims all benefits accruing under 35 U.S.C. §119 from China Patent Application No. 201410351924.6, filed on Jul. 23, 2014 in the China Intellectual Property Office, disclosure of which is incorporated herein by reference.

BACKGROUND

1. Technical Field

The present disclosure relates to a method for making electrothermal actuators.

2. Description of Related Art

Conventional electrothermal actuator is a membrane structure of which main material is polymer. When a current is applied, a temperature of the polymer is increased, which can lead to a sensible volume expansion of the polymer, and then the membrane structure bends and the electrothermal actuator is activated. Thus, electrode materials of the electrothermal actuator are required to be excellent conductive, flexible, and thermally stable due to its operating principle.

Composite materials containing carbon nanotubes are conductive and already being used for electrothermal actuators. When a current is applied, the electrothermal composite materials containing carbon nanotubes can generate heat. Then a volume of the electrothermal composite materials containing carbon nanotubes is expanded and the electrothermal composite materials are bended. Electrothermal actuators obtained by conventional methods containing carbon nanotubes include a flexible polymer matrix and carbon nanotubes dispersed in the flexible polymer matrix. However, a deformation of conventional electrothermal actuators containing carbon nanotubes is not large enough, and a response rate of conventional electrothermal actuators is slow, which are not beneficial to practical application.

BRIEF DESCRIPTION OF THE DRAWINGS

Implementations of the present technology will now be described, by way of example only, with reference to the attached figures.

DETAILED DESCRIPTION

Figure 1:
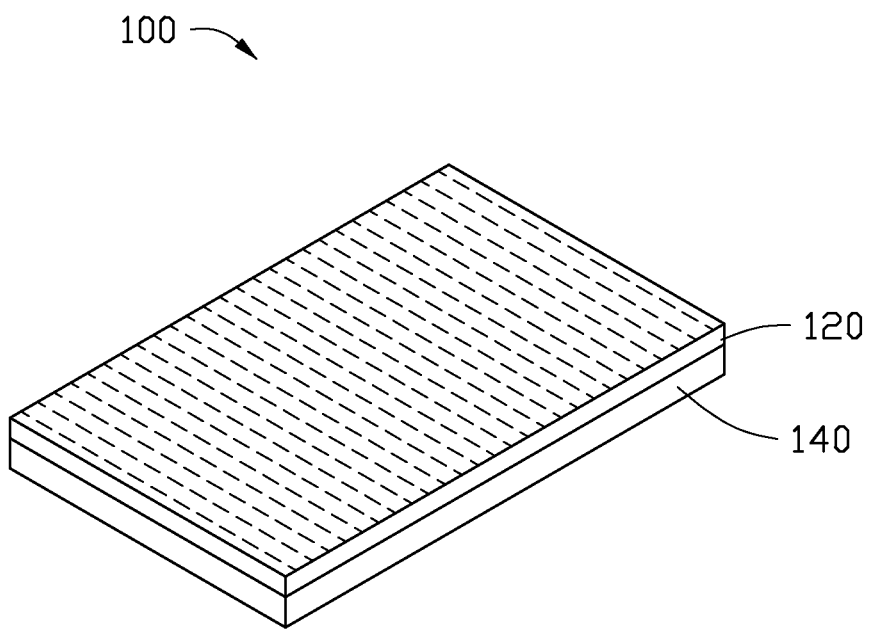
FIG. 1 shows a schematic structural view of one embodiment of an electrothermal composite material.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIG. 1, a first embodiment of an electrothermal composite material 100 includes a flexible polymer layer 140 and a carbon nanotube paper 120. The carbon nanotube paper 120 is stacked on the flexible polymer layer 140 and at least partly embedded into the flexible polymer layer 140. A thermal expansion coefficient of the flexible polymer layer 140 is greater than or equal to ten times that of the carbon nanotube paper 120. In one embodiment, the thermal expansion coefficient of the flexible polymer layer 140 is greater than or equal to one hundred times that of the carbon nanotube paper 120.

A thickness of the carbon nanotube paper 120 is in a range from about 30 micrometers to about 50 micrometers. A conductivity of the carbon nanotube paper 120 along a first direction parallel to a surface of the carbon nanotube paper 120 is in a range from about 1000 S/m to about 6000 S/m. When the conductivity of the carbon nanotube paper 120 along the first direction is too large, such as greater than 6000 S/m, if a predetermined voltage (such as 10V) is applied to the carbon nanotube paper 120, the carbon nanotube paper 120 can not generate enough heat to cause the thermal expansion and deformation of the flexible polymer layer 140. When the conductivity of the carbon nanotube paper 120 along the first direction is too small, such as less than 1000 S/m, if the predetermined voltage is applied to the carbon nanotube paper 120, a thermal response rate of the electrothermal composite material 100 will be too slow. In one embodiment, the conductivity of the carbon nanotube paper 120 along the first direction is in a range from about 2000 S/m to about 3500 S/m. A density of the carbon nanotube paper 120 can be greater than or equal to 0.5 g/cm$^3$, thus, a tensile strength of the carbon nanotube paper 120 can be greater than 3 Mpa. When the density of the carbon nanotube paper 120 is less than 0.5 g/cm$^3$, the tensile strength of the carbon nanotube paper 120 is too small to be easily disrupted during the thermal expansion and deformation of the flexible polymer layer 140. In one embodiment, the density of the carbon nanotube paper 120 is greater than or equal to 0.5 g/cm$^3$ and less than or equal to 1.2 g/cm$^3$.

The carbon nanotube paper 120 includes a plurality of carbon nanotubes extending substantially along the same direction and joined end-to-end by Van der Waals attractive force. The plurality of carbon nanotubes are parallel to the surface of the carbon nanotube paper 120. An angle between an extending direction of the plurality of carbon nanotubes and the first direction is in a range from about 45° to about 90°, therefore, the electrical conductivity of the carbon nanotube paper 120 along the first direction is in the range from about 1000 S/m to about 6000 S/m. In one embodiment, the angle between the extending direction of the plurality of carbon nanotubes and the first direction ranges from about 80° to about 90°.

In one embodiment, the carbon nanotube paper 120 is rectangular with a length of 6 centimeters, a width of 3 centimeters, and a thickness of 30 micrometers. The tensile strength of the carbon nanotube paper is about 4 Mpa. The density of the carbon nanotube paper 120 is about 1.0 g/cm$^3$. And the angle between the extending direction of the plurality of carbon nanotubes and the first direction is about 90°.

The flexible polymer layer 140 can be a sheet with a thickness ranging from about 270 micrometers to about 450 micrometers to meet the needs of both large deformation and high thermal response rate. The flexible polymer layer 140 can be overlapped with the carbon nanotube paper 120. A material of the flexible polymer layer 140 can have a good shape memory effect and an excellent thermal property. The flexible polymer layer 140 has an original shape at a starting temperature. The shape memory effect refers to that when the temperature of the flexible polymer layer 140 is higher than a certain temperature, the flexible polymer layer 140 deforms, and when the temperature of the flexible polymer layer 140 returns to the starting temperature, the flexible polymer layer 140 returns to the original shape. The material of the flexible polymer layer 140 can be silicone rubber, poly methyl methacrylate, polyurethane, epoxy resin, poly ethyl acrylate, polystyrene, polybutadiene, polyacrylonitrile, polyaniline, polypyrrole, polythiophene or combinations thereof. In one embodiment, the flexible polymer layer 140 is a silicone rubber membrane with a thickness of 300 micrometers and a thermal expansion coefficient of 3.1×10$^{-4}$/K.

A thickness ratio of the carbon nanotube paper 120 and the flexible polymer layer 140 can be in a range from about 1:7 to about 1:10. If the thickness ratio is too small, such as less than 1:10, a temperature rise of the flexible polymer layer 140 will be too slow when it is heated by the carbon nanotube paper 120, thus, the thermal response rate of the electrothermal composite material 100 will be too slow. If the thickness ratio is too great, such as greater than 1:7, a difference of thermal expansion quantities between the carbon nanotube paper 120 and the flexible polymer layer 140 will be too small due to that the thermal expansion quantity is proportion to both the thermal expansion coefficient and a volume, thus, the deformation of the electrothermal composite material 100 will be too small. In one embodiment, the thickness ratio of the carbon nanotube paper 120 and the flexible polymer layer 140 is about 1:9.

When the electrothermal composite material 100 is in application, the predetermined voltage is applied to the carbon nanotube paper 120, a current is transmitted through a conductive network formed by the plurality of carbon nanotubes. The carbon nanotube paper 120 converts the electric energy to heat, thereby heating and expanding the flexible polymer layer 140. The thermal expansion coefficients of the flexible polymer layer 140 and the carbon nanotube paper 120 are different, so that the electrothermal composite material 100 bends in a direction oriented to the carbon nanotube paper 120 which has a smaller thermal expansion coefficient. The thermal response rate of the electrothermal composite material 100 is less than ten seconds. The electrothermal composite material 100 can be bent 180° within ten seconds. The electrothermal composite material 100 can repeatedly bend over 10,000 times due to the excellent mechanical properties of the carbon nanotube.

Figure 2:
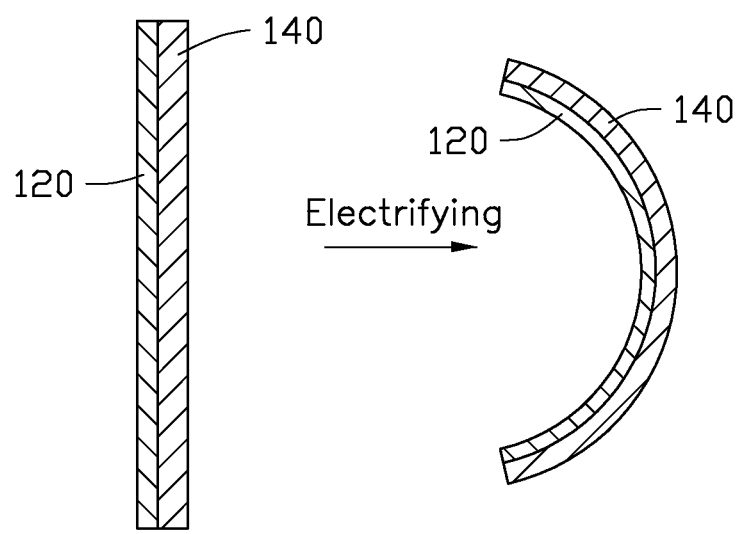
FIG. 2 shows a schematic of a first embodiment of an electrothermal composite material before and after electrifying.

Referring to FIG. 2, in one embodiment, a voltage of 20V and a current of 0.2 A are applied by a power source to the electrothermal composite material 100 through conduct wires. The electrothermal composite material 100 bends 180° to the side of the carbon nanotube paper 120 within 8 seconds.

Figure 3:
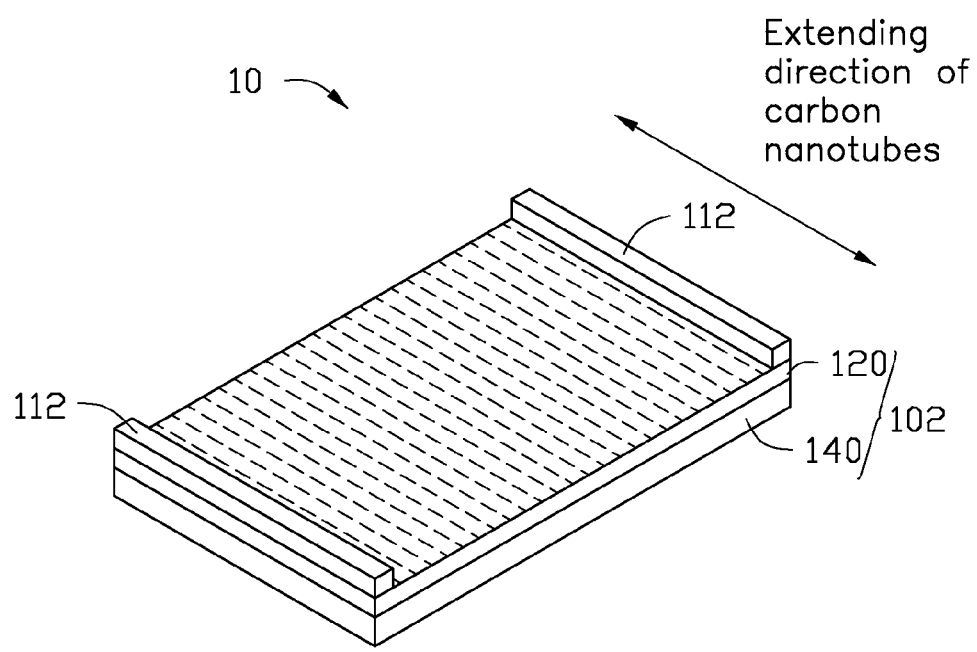
FIG. 3 shows a schematic structural view of a second embodiment of an electrothermal actuator.

Referring to FIG. 3, a second embodiment of an electrothermal actuator 10 includes an operating portion 102 and two electrodes 112. The operating portion 102 is a long strip formed by cutting the electrothermal composite material 100. The operating portion 102 at least partially extends along the first direction. The extending direction of the plurality of carbon nanotubes is substantially perpendicular to a longitudinal direction of the operating portion 102. The conductivity of the operating portion 102 along the longitudinal direction is about 3000 S/m, and the conductivity of the operating portion 102 along the extending direction of the plurality of carbon nanotubes is about 30000 S/m. An extending direction of the two electrodes 112 is substantially perpendicular to the longitudinal direction of the operating portion 102. The two electrodes 112 are parallel to and spaced apart from each other. The two electrodes 112 can be located on opposite ends of the operating portion 102 along the longitudinal direction and electrically connected with the carbon nanotube paper 120.

The two electrodes 112 can be made of metal, carbon nanotubes, conductive silver paste or any other suitable conductive materials. The conductive property of the two electrodes 112 is substantially unaffected by the bend of the operating portion 102. In one embodiment, the two electrodes 112 are made of conductive flexible material such as metal, carbon nanotubes or conductive silver paste. The number of the electrodes 112 is not limited to two and can be set as desired.

During an operation of the electrothermal actuator 10, a voltage is applied to the two electrodes 112. A current flow through the operation portion 102 along the longitudinal direction. The operation portion 102 converts the electric energy to heat. Since the conductivity of the operating portion 102 along the longitudinal direction is about 3000 S/m, the electrothermal actuator 10 can bend quickly along the longitudinal direction.

Figure 4:
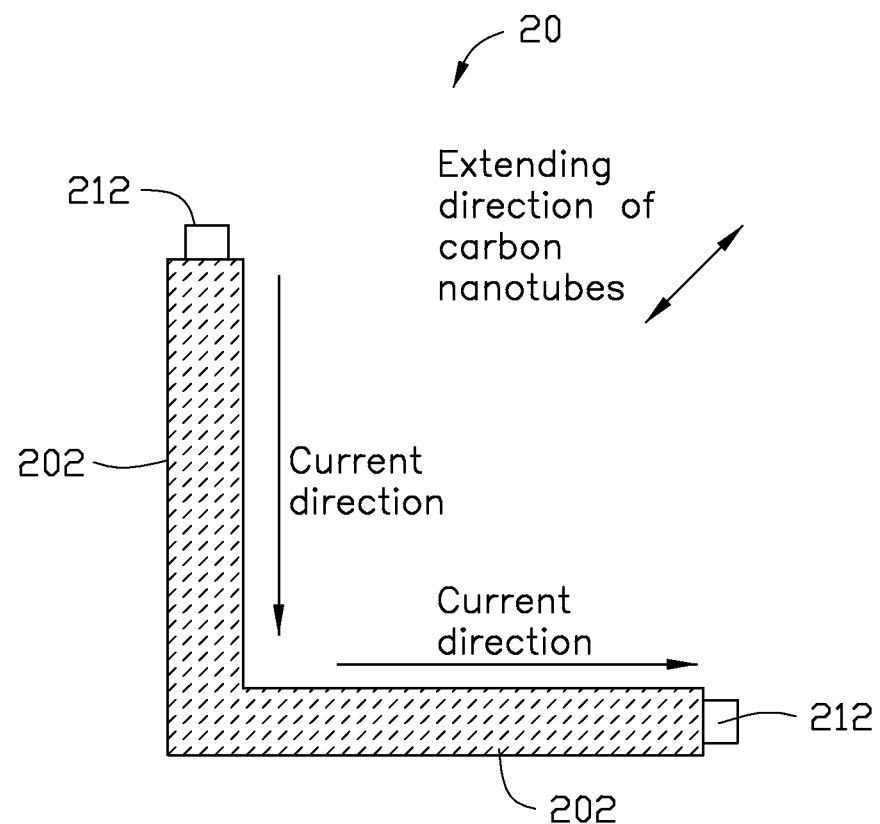
FIG. 4 shows a schematic structural view of a third embodiment of an electrothermal actuator.

Referring to FIG. 4, a third embodiment of an electrothermal actuator 20 includes two operating portions 202 and two electrodes 212. The two operating portions 202 are connected with each other to form an L-shape structure with a conductive path, wherein each operating portions 202 is a long strip obtained by cutting the electrothermal composite material 100. The two electrodes 212 are respectively located on two ends of the L-shape structure and electrically connected with the conductive path. Thus, a current can be introduced to the L-shape structure via the two electrodes 212.

Each of the two operating portions 202 includes a plurality of carbon nanotubes extending substantially along the same direction and joined end-to-end by Van der Waals attractive force in the extending direction. An angle between the extending direction of the plurality of carbon nanotubes and a current direction is about 45°. Thus, a conductivity of each operating portions 202 along the current direction is in a range from about 1000 S/m to about 6000 S/m. When a predetermined voltage is applied to the two electrodes 212, the two operating portions 202 can generate heat and respectively bend along the current direction.

Figure 5:
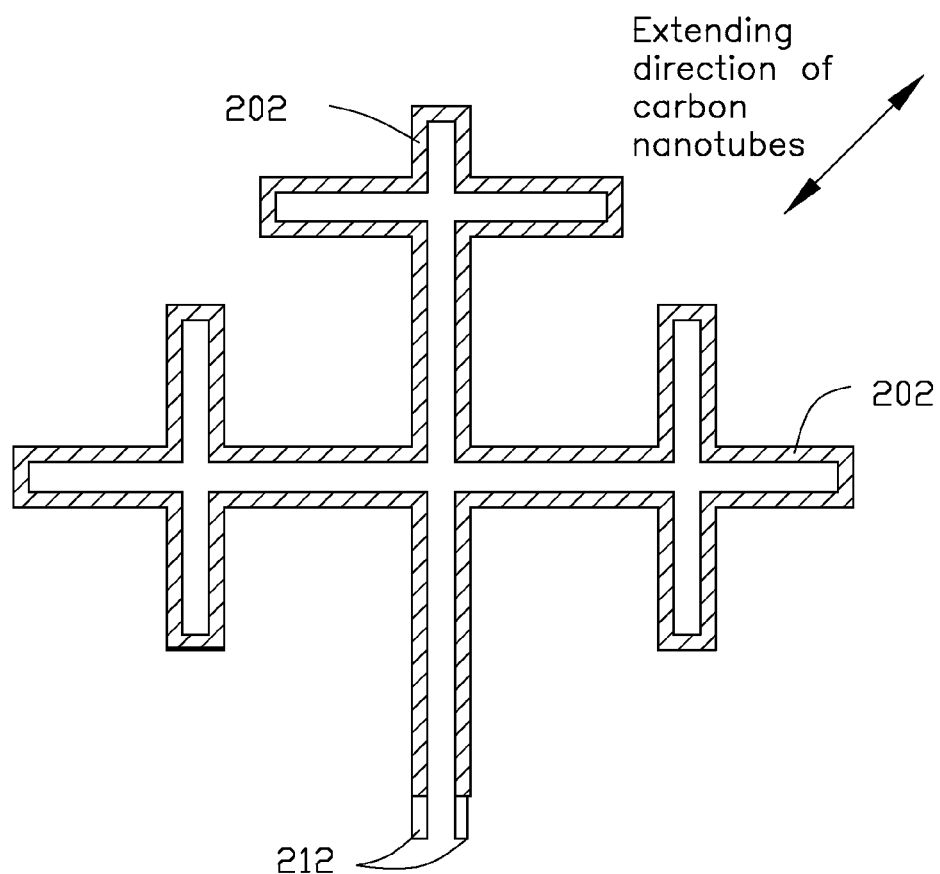
FIG. 5 shows a schematic structural view of a third embodiment of an electrothermal actuator with different shape.

The electrothermal actuator 20 can also include at least three operating portions 202 as shown in FIG. 5, and the at least three operating portions 202 can be connected with each other to form different structures as long as the conductivity of each operating portions 202 along the current direction is in the range from about 1000 S/m to about 6000 S/m. Multifunctional actuation can be realized by electrothermal actuators 20 with the different structures formed by the at least three operating portions 202.

Figure 6:
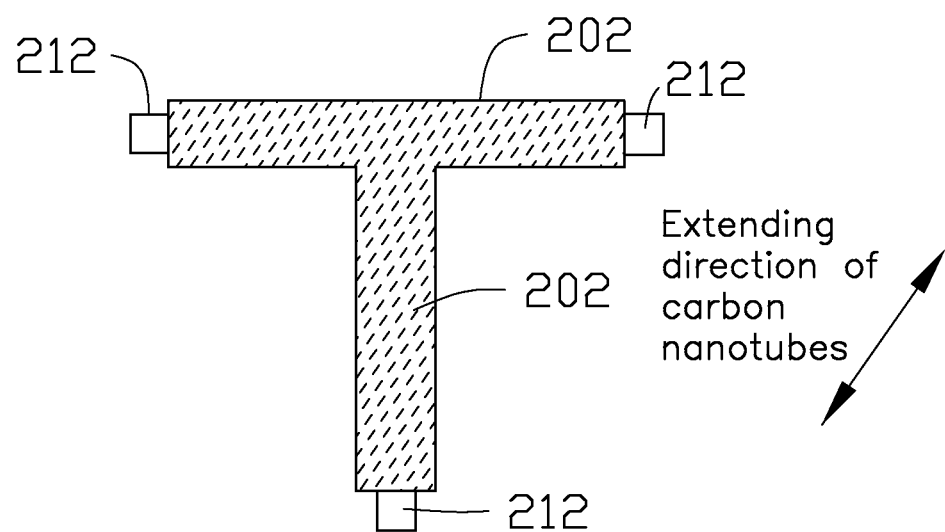
FIG. 6 shows a schematic structural view of a third embodiment of an electrothermal actuator with a plurality of electrodes.

The structure formed by the at least two operating portion 202 can have at least two conductive paths, and more than two electrodes 212. The at least two conductive paths are electrically connected in parallel as shown in FIG. 6. The electrothermal actuator 20 includes two operating portions 202 and three electrodes 212. The two operating portions 202 are connected with each other to form a T-shape structure with two conductive paths, and the three electrodes 212 are located on three ends of the T-shape structure and electrically connected to the two conductive paths in parallel.

The structure formed by the at least two operating portions 202 can be an integrated structure obtained by cutting the electrothermal composite material 100. The at least two operating portions 202 can also be glued together by a conductive adhesive. In one embodiment, each of the flexible polymer layer 140 and the carbon nanotube paper 120 of the electrothermal actuators 20 is an integrated structure.

The angle between the extending direction of the plurality of carbon nanotubes and the current direction, in each of the at least two operating portions 202, is not limited to about 45°, as long as the conductivity of each operating portions 202 is in the range from about 1000 S/m to about 6000 S/m along the current direction. In one embodiment, the angle between the extending direction of the plurality of carbon nanotubes and the current direction, in each of the at least two operating portions 202, is in a range from about 45° to about 90°. In another embodiment, the angle between the extending direction of the plurality of carbon nanotubes and the current direction, in each of the at least two operating portions 202, is in a range from about 80° to about 90°.

Figure 7:
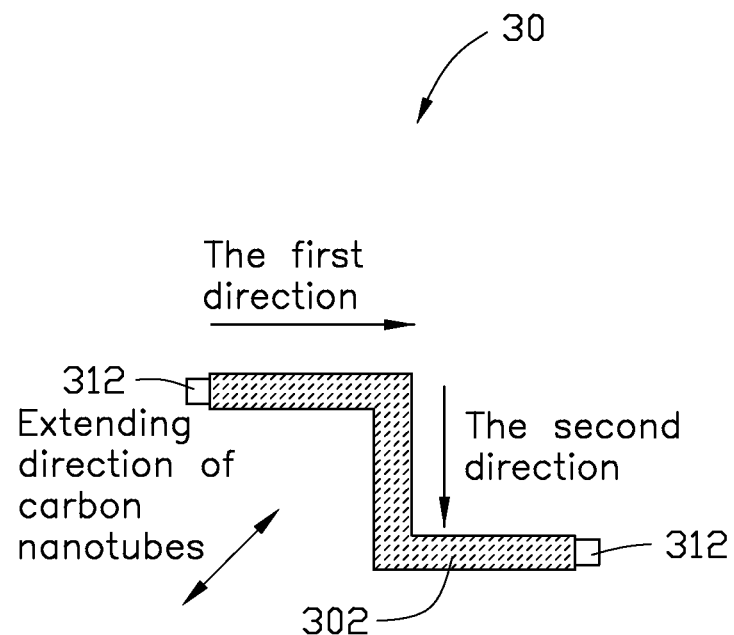
FIG. 7 shows a schematic structural view of a fourth embodiment of an electrothermal actuator.

Referring to FIG. 7, a fourth embodiment of an electrothermal actuator 30 includes a long strip operating portion 302 and two electrodes 312. The long strip operating portion 302 consecutively bends along a first direction and a second direction to form a " ⌐ " shape conductive path. The two electrodes 312 are respectively located on two ends of the long strip operating portion 302 and electrically connected with the " ⌐ " shape conductive path. Thus, a current can be introduced to the " ⌐ " shape conductive path via the two electrodes 312.

The long strip operating portion 302 is obtained by cutting the electrothermal composite material 100. The long strip operating portion 302 includes a plurality of carbon nanotubes extending substantially along the same direction, and joined end-to-end by Van der Waals attractive force in the extending direction. The first direction is substantially perpendicular to the second direction. A first angle between the extending direction of the plurality of carbon nanotubes and the first direction is about 45°. A second angle between the extending direction of the plurality of carbon nanotubes and the second direction is about 45°. Thus a conductivity of the long strip operating portion 302 along the first direction and the second direction are both in a range from about 1000 S/m to about 6000 S/m. When a predetermined voltage is applied, a first segment of the long strip operating portion 302 extending along the first direction will bend along the first direction, and a second segment of the long strip operating portion 302 extending along the second direction will bend along the second direction.

The first direction is not limited to be perpendicular to the second direction, and the first angle and the second angle are not limited to be 45°, as long as the conductivity of the long strip operating portion 302 along the first direction and the second direction are both in the range from about 1000 S/m to about 6000 S/m. In one embodiment, each of the first angle and the second angle is in a range from about 45° to about 90°. In one embodiment, each of the first angle and the second angle is in a range from about 80° to about 90°.

The conductive path formed by the long strip operating portion 302 is not limited to the " ⌐ " shape. Conductive paths with different shapes can be selected according to need.

Figure 8:
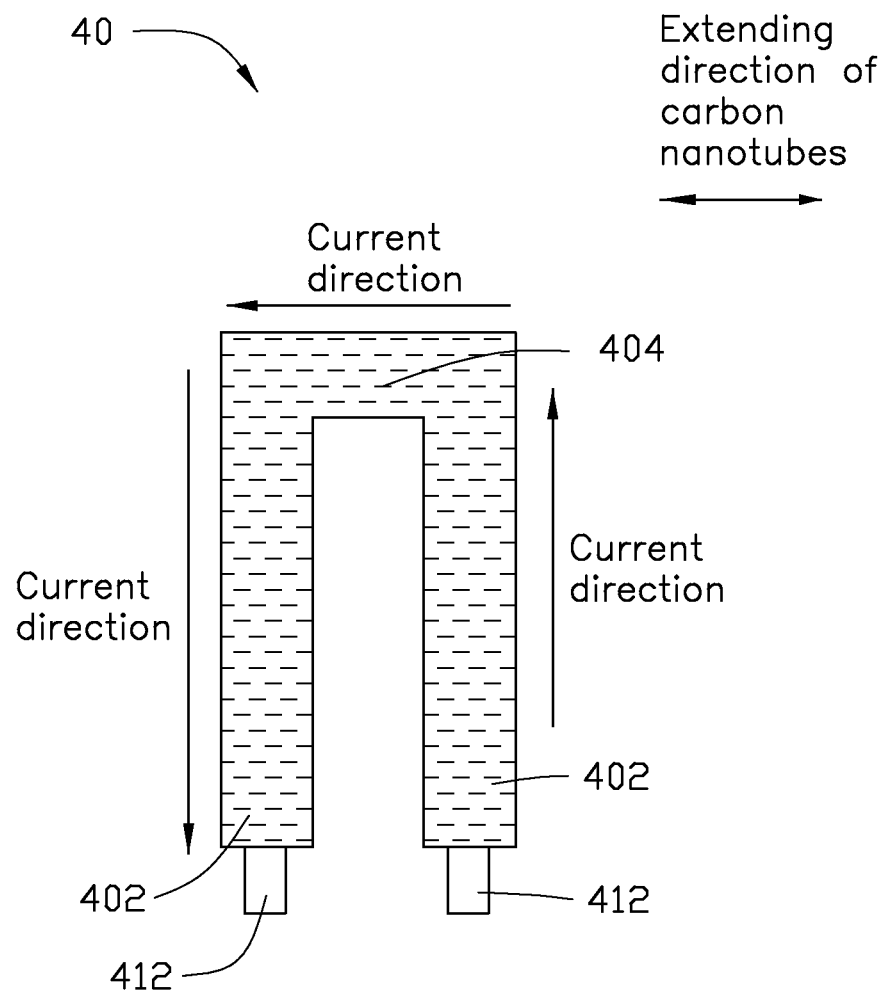
FIG. 8 shows a schematic structural view of a fifth embodiment of an electrothermal actuator.

Referring to FIG. 8, a fifth embodiment of an electrothermal actuator 40 includes two operating portions 402, a connecting portion 404 and two electrodes 412. Each of the two operating portions 402 and the connecting portion 404 are respectively a long strip obtained by cutting the electrothermal composite material 100. The two operating portions 402 are parallel to and spaced apart from each other, and further electrically connected with each other by the connecting portion 404. The two operating portions 402 and the connecting portion 404 together define a U-shape structure with a conductive path. The U-shape structure can be an integrated structure obtained by cutting the electrothermal composite material 100. The two electrodes 412 are respectively located on two ends of the U-shape structure. A current can be introduced to the conductive path via the two electrodes 412.

Each of the two operating portions 402 and the connecting portion 404 includes a plurality of carbon nanotubes extending substantially along the same direction and joined end-to-end by Van der Waals attractive force in the extending direction. A first angle between a first extending direction of the plurality of carbon nanotubes in each of the two operating portions 402 and a current direction is about 90°, thus a conductivity of each of the two operating portions 402 along the current direction is in a range from about 1000 S/m to about 6000 S/m. A second angle between a second extending direction of the plurality of carbon nanotubes in the connecting portion 404 and the current direction is about 0°, thus a conductivity of the connecting portions 404 along the current direction is greater than 6000 S/m. The first extending direction of the plurality of carbon nanotubes in each of the two operating portions 402 can be same with the second extending direction of the plurality of carbon nanotubes in the connecting portion 404.

The connecting portion 404 is only used to electrically connect the two operating portions 402. The connecting portion 404 has excellent conductivity more than 6000 S/m. Thus, small heat is generated by the connecting portion 404 when the current is introduced and the connecting portion 404 cannot bend along the current direction. Therefore, the actuating direction of the electrothermal actuator 40 only depends on a bend direction of the two operating portions 402. When the current is introduced to the conductive path via the two electrodes 412, the two free ends of the two operating portions 402 away from the connecting portion 404 can be fixed, thus the two operating portions 402 can bend along a direction from the end connected with the connecting portion 404 to the free end away from the connecting portion 404. Thus, the electrothermal actuator 40 with the U-shape structure can be actuated along lengthways.

The first angle between the first extending direction of the plurality of carbon nanotubes in each of the two operating portions 402 and the current direction is not limited to 90°, as long as the conductivity of each of the two operating portions 402 along the current direction is in the range from about 1000 S/m to about 6000 S/m. In one embodiment, the first angle between the first extending direction of the plurality of carbon nanotubes in each of the two operating portions 402 and the current direction is in a range from about 45° to about 90°. In one embodiment, the first angle between the first extending direction of the plurality of carbon nanotubes in each of the two operating portions 402 and the current direction is in a range from about 80° to about 90°.

The second angle between the second extending direction of the plurality of carbon nanotubes in the connecting portions 404 and the current direction is not limited to 0°, as long as the conductivity of the connecting portions 404 along the current direction is greater than 6000 S/m. In one embodiment, the second angle between the second extending direction of the plurality of carbon nanotubes in the connecting portions 404 and the current direction is more than or equal to 0° and less than 45°. In one embodiment, the second angle between the second extending direction of the plurality of carbon nanotubes in the connecting portions 404 and the current direction is in a range from about 0° to about 10°.

The electrothermal actuator 40 can also include at least three operating portions 402, at least two connecting portion 404 and at least three electrodes 412. The at least three operating portions 402 and the at least two connecting portions 404 can define different structures, as long as the conductivity of each of the at least three operating portions 402 along the current direction is in the range from about 1000 S/m to about 6000 S/m, and the conductivity of the at least two connecting portions 404 along the current direction is more than 6000 S/m.

Figure 9:
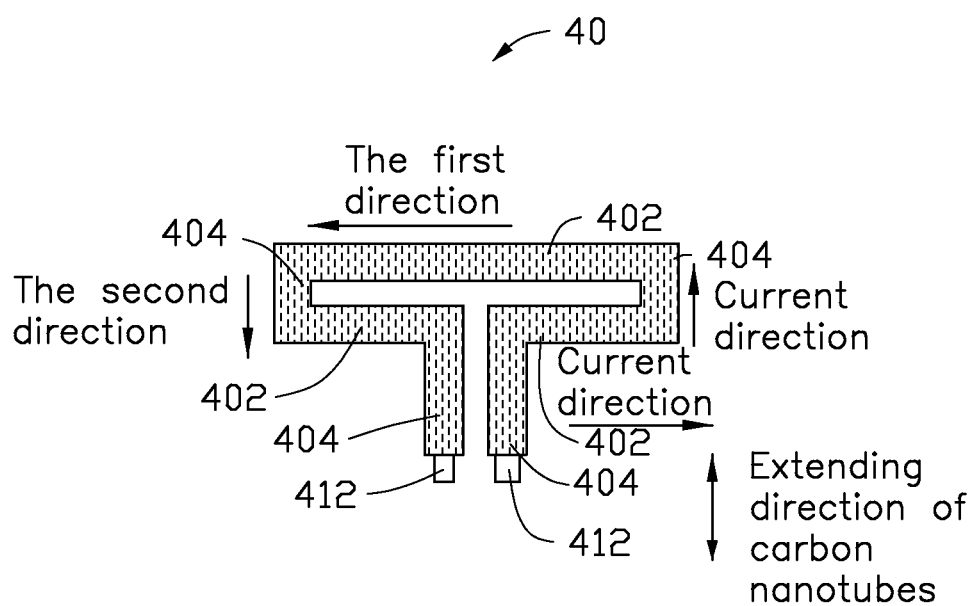
FIG. 9 shows a schematic structural view of a fifth embodiment of an electrothermal actuator with different shape.

Referring to FIG. 9, the electrothermal actuator 40 includes a plurality of operating portions 402, a plurality of connecting portions 404 and two electrodes 412. Each of the plurality of operating portions 402 and each of the plurality of connecting portions 404 are respectively a long strip obtained by cutting the electrothermal composite material 100. The plurality of connecting portions 404 is used to connect the plurality of operating portions 402 with each other and to connect the plurality of operating portions 402 with the two electrodes 412. The plurality of operating portions 402 and the plurality of connecting portions 404 define a T-shaped structure together with a conductive path. The T-shaped structure can be an integrated structure obtained by cutting the electrothermal composite material 100. The two electrodes 412 are located on two ends of the T-shaped structure to introduce a current to the conductive path.

Each of the plurality of operating portions 402 includes a plurality of carbon nanotubes extending substantially along the same direction and joined end-to-end by Van der Waals attractive force in the extending direction. A first angle between the first extending direction of the plurality of carbon nanotubes in each of the plurality of operating portions 402 and a current direction is about 90°. A second angle between the second extending direction of the plurality of carbon nanotubes in the plurality of connecting portion 404 and the current direction is about 0°. The first extending direction of the plurality of carbon nanotubes in each of the plurality of operating portions 402 can be same with the second extending direction of the plurality of carbon nanotubes in each of the plurality of connecting portions 404. When the current is introduced to the conductive path via the two electrodes 412, the plurality of operating portions 402 can be bent from both ends to the center, and the electrothermal actuator 40 with the T-like structure can be actuated along a transverse direction.

The operating portion 402 and the connecting portion 404 can define different conductive paths with different shapes, thereby achieving different bend actuator.

The operating portion 402 and the connecting portion 404 can also form at least two conductive paths. The at least two conductive paths are electrically connected in parallel or in series.

Figure 10:
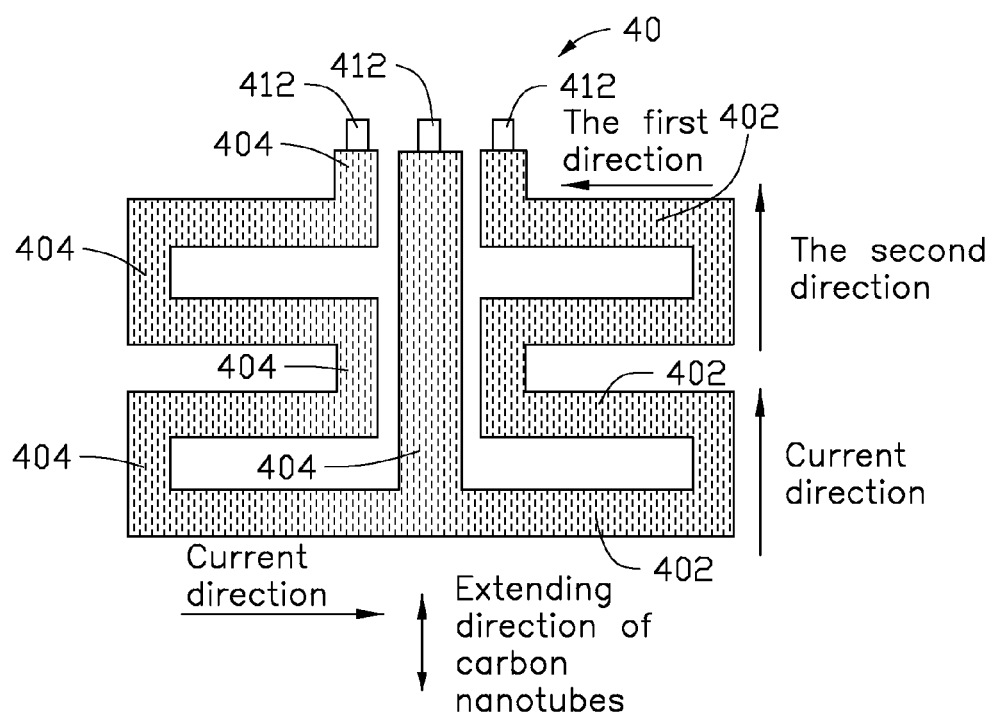
FIG. 10 shows a schematic structural view of a fifth embodiment of an electrothermal actuator with a plurality of conductive paths.

Referring to FIG. 10, the electrothermal actuator 40 includes a plurality of operating portions 402, a plurality of connecting portions 404 and three electrodes 412. The plurality of operating portions 402 and the plurality of connecting portions 404 are connected to form two conductive paths. The three electrodes 412 are located on the two conductive paths and spaced from each other. The three electrodes 412 can introduce current to the two conductive paths at the same time to make the two conductive paths being electrically connected in parallel.

Each of the plurality of operating portions 402 extends along a first direction, and each of the plurality of connecting portions 404 extends along a second direction. The conductivity of each of the plurality of operating portions 402 along the first direction is in the range from about 1000 S/m to about 6000 S/m, and the conductivity of the plurality of connecting portions 404 along the second direction is more than 6000 S/m. A first angle between the first extending direction of the plurality of carbon nanotubes in the operating portions 402 and the first direction is more than or equal to 45° and less than 90°. A second angle between the second extending direction of the plurality of carbon nanotubes in the connecting portions 404 and the second direction is more than or equal to 0° and less than 45°.

Figure 11:
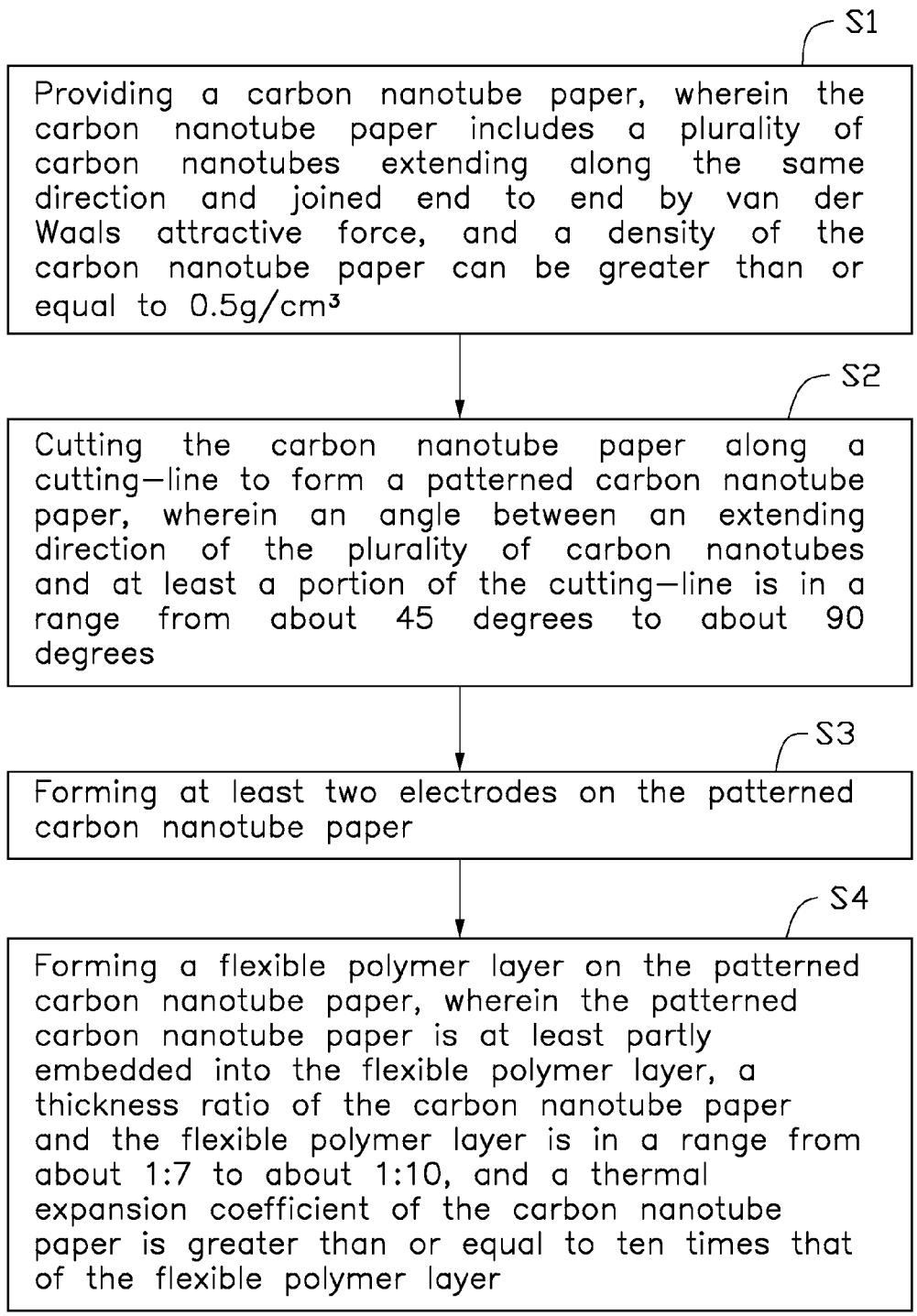
FIG. 11 shows a flow chart of one embodiment of a method of making an electrothermal actuator.

FIG. 11 illustrates one embodiment of a method for making an electrothermal actuator, which includes the following steps:

S1: providing a carbon nanotube paper, wherein the carbon nanotube paper includes a plurality of carbon nanotubes extending along the same direction and joined end to end by van der Waals attractive force, and a density of the carbon nanotube paper can be greater than or equal to 0.5 g/cm$^3$;

S2: cutting the carbon nanotube paper along a cutting-line to form a patterned carbon nanotube paper, wherein an angle between an extending direction of the plurality of carbon nanotubes and at least a portion of the cutting-line is in a range from about 45 degrees to about 90 degrees;

S3: forming at least two electrodes on the patterned carbon nanotube paper; and

S4: forming a flexible polymer layer on the patterned carbon nanotube paper, wherein the patterned carbon nanotube paper is at least partly embedded into the flexible polymer layer, a thickness ratio of the carbon nanotube paper and the flexible polymer layer is in a range from about 1:7 to about 1:10, and a thermal expansion coefficient of the flexible polymer layer is greater than or equal to ten times that of the carbon nanotube paper.

In step S1, a method for making the carbon nanotube paper includes the following steps:

S11: providing a roller and a pressing device, wherein the roller has an axis, the pressing device has a pressing surface opposing to the roller, and the pressing surface is parallel to the axis of the roller;

S12: providing a carbon nanotube array, forming a carbon nanotube film structure by drawing a plurality of carbon nanotubes from the carbon nanotube array, and fixing the carbon nanotube film structure to the roller;

S13: spinning the roller to wind the carbon nanotube film structure to the roller, the pressing device grinds or presses the carbon nanotube film structure to compact the carbon nanotube film structure and obtain the carbon nanotube paper.

The thickness and strength of the carbon nanotube paper can be controlled by the number of the carbon nanotube film. Examples of methods for making carbon nanotube papers are taught by U.S. Pat. No. 9,017,503 to Zhang et al.

In one embodiment, the thickness of the carbon nanotube paper is in a range from about 30 micrometers to about 50 micrometers. A conductivity of the carbon nanotube paper along the extending direction of the plurality of carbon nanotubes is about 3000 S/m, and a conductivity along a direction perpendicular to the extending direction of the plurality of carbon nanotubes is about 30000 S/m.

In step S2, The patterned carbon nanotube paper can be L-shape, U-shape, "✝" shape, palm shape, or other shapes. The cutting-line can be a curved line or a folded line. The cutting-line extends along a first direction and an second direction, the seventh direction and the eighth direction can be perpendicular to each other.

In one embodiment, an angle of the extending direction of the carbon nanotubes and the first direction is about 45 degrees, and an angle of the extending direction of the carbon nanotubes and the second direction is about 45 degrees; therefore, the conductivity of the patterned carbon nanotube paper along the first direction and the second direction are both ranged from about 1000 S/m to about 6000 S/m. In another embodiment, the angle of the extending direction of the carbon nanotubes and the first direction is about 90 degrees, an angle of the extending direction of the carbon nanotubes and the second direction is about 0 degree; therefore, the conductivity of the patterned carbon nanotube paper along the seventh direction is ranged from about 1000 S/m to about 6000 S/m, and the conductivity of the patterned carbon nanotube paper along the eighth direction is greater than 6000 S/m. In one embodiment, the cutting-line is closed to form a conductive path.

In one embodiment, the carbon nanotube paper is cut by laser.

In step S3, at least two electrodes adhered to the patterned carbon nanotube paper via conductive adhesive. The conductive adhesive can be selected from silver conductive adhesive, gold conductive adhesive, copper conductive adhesive, carbon-based conductive adhesive or combination thereof. In one embodiment, the conductive adhesive is conductive silver paste.

In step S4, a method for forming the flexible polymer layer on the patterned carbon nanotube paper includes the following steps:

S41: putting the patterned carbon nanotube paper in a mold;

S42: injecting a flexible polymer prepolymer, which is in a viscous-liquid state, into the mold; wherein the patterned carbon nanotube paper is completely immersed in the flexible polymer prepolymer;

S43: solidifying the flexible polymer prepolymer to form the flexible polymer layer; and removing the mold; and S44: removing part of the flexible polymer layer that is not overlapped with the patterned carbon nanotube paper along edges of the patterned carbon nanotube paper.

In step S41, the putting the patterned carbon nanotube paper in the mold includes coating a release agent on an inner surface of the mold. The release agent is propitious to remove the mold.

In step S42, the material of the flexible polymer prepolymer can be silicone rubber prepolymer, poly methyl methacrylate prepolymer, polyurethane prepolymer, epoxy resin prepolymer, poly ethyl acrylate prepolymer, polystyrene prepolymer, polybutadiene prepolymer, polyacrylonitrile prepolymer, polyaniline prepolymer, polypyrrole prepolymer, polythiophene prepolymer or combinations thereof. In one embodiment, the flexible polymer prepolymer is silicone rubber prepolymer.

The carbon nanotube paper can include a plurality of micropores and the flexible polymer prepolymer can permeate in the micropores of the carbon nanotube paper. Thus the carbon nanotube paper can be at least partly embedded into the flexible polymer layer and combined with the flexible polymer layer closely.

In one embodiment, the flexible polymer prepolymer is deaerated before solidifying. A method for deaerating the flexible polymer prepolymer can be vacuum deaeration.

In step S43, a method for solidifying the flexible polymer prepolymer can be heating.

A thickness of the flexible polymer layer is ranged from about 270 micrometers to about 450 micrometers. If the thickness is too large, a temperature rise of the flexible polymer layer will be too slow when it is heated by the carbon nanotube paper, thus, the thermal response rate of the electrothermal composite material will be too slow. If the thickness is too small, a difference of thermal expansion quantities between the carbon nanotube paper and the flexible polymer layer will be too small due to that the thermal expansion quantity is proportion to both the thermal expansion coefficient and a volume, thus, the deformation of the electrothermal composite material 100 will be too small.

A thickness ratio of the carbon nanotube paper and the flexible polymer layer can be in a range from about 1:7 to about 1:10. In such range the thermal response rate of the electrothermal actuator is high, and the deformation of the electrothermal actuator is large. In one embodiment, the thickness ratio of the carbon nanotube paper and the flexible polymer layer is about 1:9.

The flexible polymer layer has substantially the same shape as that of the patterned carbon nanotube paper.

The electrothermal composite material and the electrothermal actuator can be used for artificial muscles, anthropomorphic robots, artificial limbs, or other bionic actuators. The electrothermal composite material and the electrothermal actuator can also be used for micro-lens focusing systems, fluid control valves, dynamic braille, or other multifunction actuators.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A method for making an electrothermal actuator comprising:
providing a carbon nanotube paper, wherein the carbon nanotube paper comprises a plurality of carbon nanotubes extending along the same direction and joined end to end by van der Waals attractive force, and a density of the carbon nanotube paper is greater than or equal to 0.5 g/cm$^3$;
forming a patterned carbon nanotube paper by cutting the carbon nanotube paper along a cutting-line, wherein an angle between an extending direction of the plurality of carbon nanotubes and at least a portion of the cutting-line is in a range from about 45 degrees to about 90 degrees, the cutting-line is a curved line and extends along a first direction and a second direction, the first direction is perpendicular to the second direction, a first angle between the extending direction of the plurality of carbon nanotubes and the first direction is about 45 degrees, and a second angle between the extending direction of the plurality of carbon nanotubes and the second direction is about 45 degrees;
electrically connecting at least two electrodes to the patterned carbon nanotube paper; and forming a flexible polymer layer on the patterned carbon nanotube paper, wherein the patterned carbon nanotube paper is at least partly embedded into the flexible polymer layer, a thickness ratio of the patterned carbon nanotube paper and the flexible polymer layer is in a range from about 1:7 to about 1:10, and a thermal expansion coefficient of the flexible polymer layer is greater than or equal to ten times that of the patterned carbon nanotube paper.

2. The method of claim 1, wherein the thermal expansion coefficient of the flexible polymer layer is greater than or equal to one hundred times that of the patterned carbon nanotube paper.

3. The method of claim 1, wherein a thickness of the carbon nanotube paper is in a range from about 30 micrometers to about 50 micrometers.

4. The method of claim 1, wherein a thickness of the flexible polymer layer is ranged from about 270 micrometers to about 450 micrometers.

5. The method of claim 1, wherein the density of the carbon nanotube paper is in a range from about 0.5 g/cm$^3$ to about 1.2 g/cm$^3$.

6. The method of claim 1, wherein a conductivity of the patterned carbon nanotube paper along the first direction and the second direction are both in a range from about 1000 S/m to about 6000 S/m.

7. The method of claim 1, wherein the forming the flexible polymer layer on the patterned carbon nanotube paper comprises:
putting the patterned carbon nanotube paper in a mold;
injecting a flexible polymer prepolymer, which is in a viscous-liquid state, into the mold, wherein the patterned carbon nanotube paper is completely immersed in the flexible polymer prepolymer; and
solidifying the flexible polymer prepolymer to form the flexible polymer layer.

8. The method of claim 7, wherein the putting the patterned carbon nanotube paper in the mold comprises coating a release agent on an inner surface of the mold.

9. The method of claim 7, wherein the flexible polymer prepolymer is deaerated before solidifying.

10. A method for making an electrothermal actuator comprising:
providing a carbon nanotube paper, wherein the carbon nanotube paper comprises a plurality of carbon nanotubes extending along the same direction and joined end to end by van der Waals attractive force, and a density of the carbon nanotube paper is greater than or equal to 0.5 g/cm$^3$;
forming a patterned carbon nanotube paper by cutting the carbon nanotube paper along a cutting-line, wherein an angle between an extending direction of the plurality of carbon nanotubes and at least a portion of the cutting-line is in a range from about 45 degrees to about 90 degrees, the cutting-line is a curved line and extends along a first direction and a second direction, the first direction is perpendicular to the second direction, a first angle between the extending direction of the plurality of carbon nanotubes and the first direction is about 90 degrees; and a second angle between the extending direction of the plurality of carbon nanotubes and the second direction is about 0 degrees;
electrically connecting at least two electrodes to the patterned carbon nanotube paper; and forming a flexible polymer layer on the patterned carbon nanotube paper, wherein the patterned carbon nanotube paper is at least partly embedded into the flexible polymer layer, a thickness ratio of the patterned carbon nanotube paper and the flexible polymer layer is in a range from about 1:7 to about 1:10, and a thermal expansion coefficient of the flexible polymer layer is greater than or equal to ten times that of the patterned carbon nanotube paper.

11. The method of claim 10, wherein a first conductivity of the patterned carbon nanotube paper along the first direction is ranged from about 1000 S/m to about 6000 S/m, and a second conductivity of the patterned carbon nanotube paper along the second direction is greater than 6000 S/m.

12. A method for making an electrothermal actuator comprising:
providing a carbon nanotube paper, wherein the carbon nanotube paper comprises a plurality of carbon nanotubes extending along the same direction and joined end to end by van der Waals attractive force, and a density of the carbon nanotube paper is greater than or equal to 0.5 g/cm$^3$;
forming a patterned carbon nanotube paper by cutting the carbon nanotube paper along a cutting-line, wherein an angle between an extending direction of the plurality of carbon nanotubes and at least a portion of the cutting-line is in a range from about 45 degrees to about 90 degrees;
electrically connecting at least two electrodes to the patterned carbon nanotube paper; and forming a flexible polymer layer on the patterned carbon nanotube paper, wherein the patterned carbon nanotube paper is at least partly embedded into the flexible polymer layer, a thickness ratio of the patterned carbon nanotube paper and the flexible polymer layer is in a range from about 1:7 to about 1:10, and a thermal expansion coefficient of the flexible polymer layer is greater than or equal to ten times that of the patterned carbon nanotube paper.

* * * * *